(12) United States Patent
Jones et al.

(10) Patent No.: US 7,438,874 B2
(45) Date of Patent: Oct. 21, 2008

(54) PRESSURE OXIDATION LEACHING IN THE PRESENCE OF AN ACIDIC SOLUTION OF HALIDE AND SULFATE IONS FROM COPPER AND BASE METAL CONTAINING ORE/CONCENTRATE

(75) Inventors: David L. Jones, Delta (CA); Rachel Moore, Delta (CA); Susan Karen Stocker, New Westminster (CA)

(73) Assignee: Cominco Engineering Services Ltd., Vancouver, British Columbia (CA)

( * ) Notice: Subject to any disclaimer, the term of this patent is extended or adjusted under 35 U.S.C. 154(b) by 511 days.

(21) Appl. No.: 10/443,090

(22) Filed: May 22, 2003

(65) Prior Publication Data

US 2004/0047780 A1    Mar. 11, 2004

(51) Int. Cl.
*C22B 23/00* (2006.01)
(52) U.S. Cl. .................... 423/24; 423/27; 423/109; 423/150.1; 423/150.5
(58) Field of Classification Search .................. 423/27, 423/24, 109, 150.1, 150.5
See application file for complete search history.

(56) References Cited

U.S. PATENT DOCUMENTS

| | | | | |
|---|---|---|---|---|
| 5,650,057 A | * | 7/1997 | Jones | 205/579 |
| 5,874,055 A | * | 2/1999 | Jones | 423/24 |
| 5,902,474 A | * | 5/1999 | Jones | 205/582 |
| 6,171,564 B1 | * | 1/2001 | Jones | 423/140 |
| 6,315,812 B1 | | 11/2001 | Fleming et al. | |
| 6,455,019 B2 | * | 9/2002 | Jones | 423/24 |
| 6,503,293 B1 | * | 1/2003 | Dempsey et al. | 75/743 |
| 2002/0012621 A1 | | 1/2002 | Jones | |

FOREIGN PATENT DOCUMENTS

WO    WO 99 09225    2/1999

OTHER PUBLICATIONS

Fleming, C.A., Ferron C.J., Dreisinger D.B. and O'Kane P.T.: "A process for the simultaneous leaching and recovery of gold, platinum group metals and base metals from ores and concentrates," Internet Article, Online! Mar. 16, 2000, pp. 1-10, XP002254648.

* cited by examiner

*Primary Examiner*—Steven Bos
(74) *Attorney, Agent, or Firm*—Borden Ladner Gervais LLP; Elbie R de Kock

(57) ABSTRACT

A process for the extraction of a base metal such as Ni, Co or Zn, from suiphide ore or concentrate containing copper and the base metal comprises the step of subjecting the ore or concentrate to pressure oxidation in the presence of oxygen and an acidic solution containing halide and sulphate ions to produce a product solution containing copper and the base metal. The product solution is subjected to a copper extraction process for recovering copper from the solution and the product solution containing the base metal after copper recovery is recirculated for recycled to the pressure oxidation to effect build-up of the base metal in the product solution. Preferably, a stream which is split from the product solution is treated for the recovery of the base metal.

10 Claims, 3 Drawing Sheets

PRESSURE OXIDATION LEACHING IN THE PRESENCE OF AN ACIDIC SOLUTION OF HALIDE AND SULFATE IONS FROM COPPER AND BASE METAL CONTAINING ORE/CONCENTRATE

FIELD OF THE INVENTION

This invention relates to a process for the extraction of metals, such as Cu, Ni, Co and Zn from an ore or concentrate, such as a low grade bulk copper-nickel-zinc concentrate.

SUMMARY OF THE INVENTION

According to the invention there is provided a process for the extraction of a base metal from an ore or concentrate containing copper and the base metal, comprising the steps of subjecting the ore or concentrate to pressure oxidation in the presence of oxygen and an acidic solution containing halide and sulphate ions to produce a product solution containing copper and the base metal; subjecting the product solution to a copper extraction process for recovering copper from the solution; and recycling the product solution containing said base metal after said copper recovery, to the pressure oxidation; whereby build-up of base metal in the product solution is effected to produce a loaded product solution; and recovering the base metal from said loaded product solution. The base metal may be recovered from a split stream taken from the product solution.

The concentrate may contain one or more base metals such as nickel, cobalt or zinc. The concentrate may contain copper and nickel in a ratio of about 7:1 to about 5:1. However, the concentrate may contain lesser or greater amounts of Ni, such as a copper to nickel ratio of about 20:1 to about 2:1.

The concentrate may be a copper sulphide concentrate which is low in some base metals, such as Ni (down to about 0.1%), Co (down to about 0.03%) and Zn (down to about 1%).

The halide may be chloride or bromide.

Further objects and advantages of the invention will become apparent from the description of preferred embodiments of the invention below.

DETAILED DESCRIPTION OF THE PREFERRED EMBODIMENTS

Figure 1:
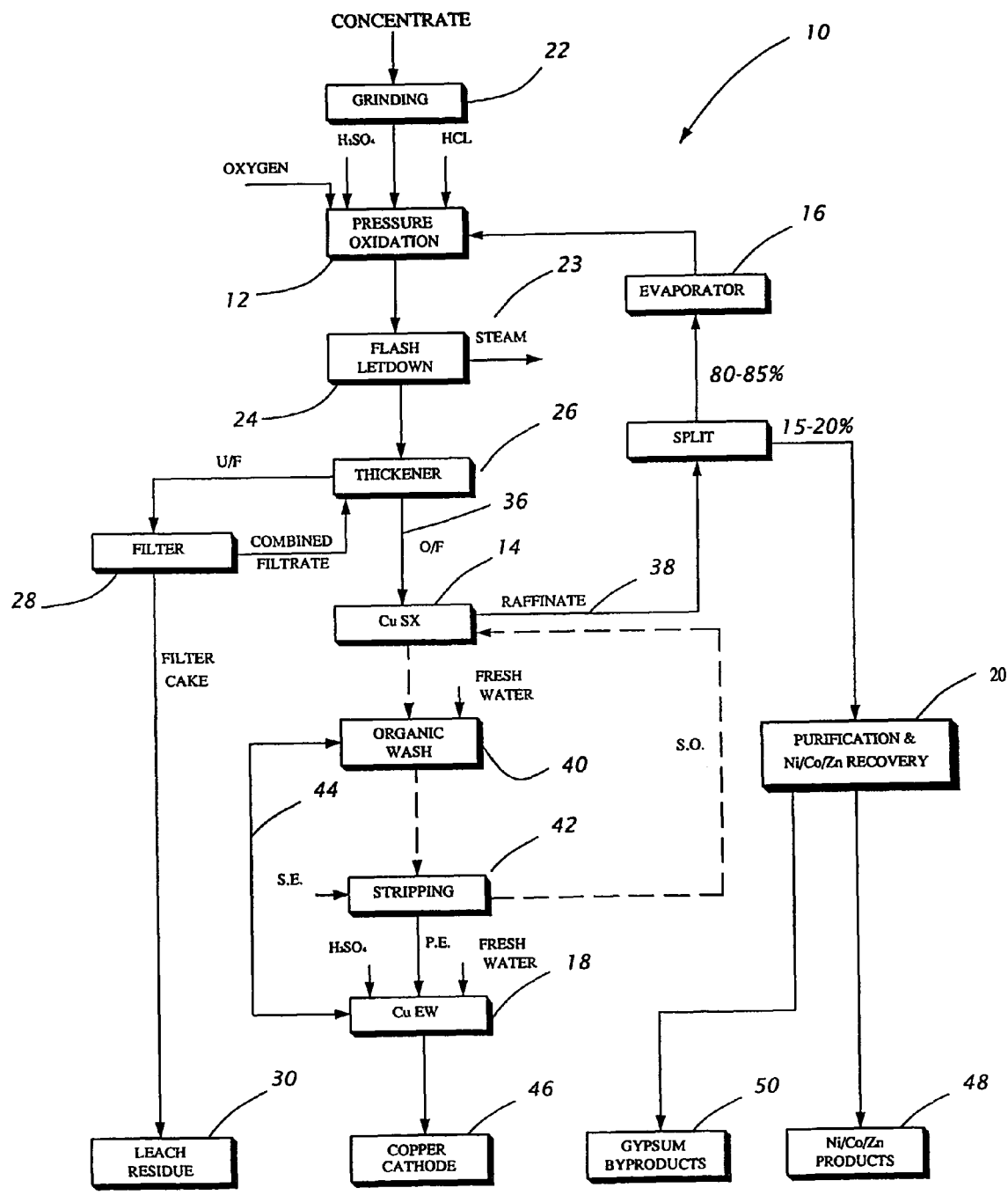
FIG. 1 is a flow diagram of a hydrometallurgical process for the extraction of metals from a sulphide ore or concentrate.

In FIG. 1, reference numeral 10 generally indicates a hydrometallurgical process for the extraction of base metals from a sulphide ore or concentrate. The process 10 comprises a pressure oxidation stage 12, a copper solvent extraction stage 14, an evaporation stage 16, and a copper electrowinning stage 18.

Prior to the pressure oxidation stage 12, the base metal concentrate is first subjected to a regrind 22 to reduce the particle size. During grinding, the concentrate is mixed with water to produce a concentrate slurry which is fed to the pressure oxidation stage 12.

The concentrate is subjected to the pressure oxidation 12 in an autoclave in the presence of an acidic solution containing sulphate, chloride.

The amount of $H_2SO_4$ introduced into pressure oxidation 12 is sufficient to allow the pH of the solution in the autoclave to go below a value of 2, preferrably 1 or lower. At the low pH, copper, nickel, zinc and cobalt (and other base metals, if present in the concentrate) are leached into the liquid phase during pressure oxidation 12 and practically none goes into the solid phase in the form of the basic solid salts, such as basic copper sulphate.

It has been found that allowing the pH of the solution in the pressure oxidation 12 to go below a value of 2 (or, preferably, below 1) enhances the overall extraction of copper and the other base metals.

The pressure oxidation 12 is carried out at a temperature of about 115° C. to about 175° C., preferably about 130° C. to about 155° C.

The pressure oxidation 12 is carried out under a combined steam and oxygen pressure of about 100 to 300 psig, or 700 to 2100 kPa, with oxygen partial pressure of about 50 to 250 psi, or 350 kPa to 1750 kPa.

The chloride ion concentration in the solution in the autoclave is maintained at about 8 to 20 g/l, preferably about 12 g/l.

The retention time in the autoclave is about 0.5 to 2.5 hours, preferably, about 1 hour, and the process is normally carried out in a continuous fashion in the autoclave. However, the process can also be carried out in a batch-wise fashion, if desired.

The solids content in the autoclave is maintained at about 12-25%, i.e. 150-300 g/l solids, as determined by the heat balance and viscosity limitations.

In some instances (certain concentrates) it has been found to be beneficial to add small concentrations of certain surfactants which change the physical and chemical characteristics of liquid elemental sulphur (S°) in the autoclave during the pressure oxidation stage 12. Surfactants such as lignin sulphonate and quebracho added in small amounts, i.e. 0.1 to 3 g/L can reduce the viscosity of the liquid sulphur and also change the chemistry in the autoclave. The purpose is to prevent agglomeration of liquid sulphur in the autoclave at the operating temperature with unreacted sulphides. This is generally not necessary, but if there is a large component of unreactive sulphides, e.g. pyrite, it can be a problem, thus requiring the addition of the surfactant as a corrective measure.

Additions of surfactants can reduce sulphur oxidation in ways that are not well understood, but are beneficial to the process. It is believed that this is due to lower viscosity, resulting in lowered tendency for liquid sulphur and solids to be held up within the autoclave, thus reducing the retenion time for these materials, and hence the reduced tendency for sulphur oxidation to occur.

The slurry produced in the autoclave is discharg d through a series of one or more flash tanks 24 to reduce the pressure to atmospheric pressure and the temperature to 90° C.-100° C. Steam is released from the flash tank 24 as indicated at 23. The liquid part of the slurry is referred to as the autoclave or pressure oxidation leach liquor 36.

The cooled slurry from the flash tank 24 is passed to a thickener 26 for liquid/solid separation. The overflow from the thickener 26, which is the autoclave leach liquor 36, is further cooled to about 40° C. by known methods such as in cooling towers (not shown). The liquor 36 is then subjected to copper solvent extraction 14 for copper recovery, as will be further described below.

The underflow from the thickener 26 is filtered, as shown at 28, and the resultant filter cake is washed thoroughly to recover entrained base metals as much as possible. The filtrate from the filter 28 is recycled to the thickener 26, leaving a residue 30, comprised mostly of hematite and elemental sulphur, that can be discarded or subjected to further treatment for precious metals recovery.

As stated above, the autoclave leach liquor 36 is subjected to copper solvent extraction 14 to produce a copper depleted raffinate 38. The major portion (about 80-85%) of the raffinate 38 is recirculated to the evaporator 16, and subsequently to the pressure oxidation 12. The remaining portion, about 15-20% of the total flow, representing a bleed stream, is further treated for the recovery of base metals, as will be further described below.

The copper solvent extraction 14 is effected by combining the autoclave leach liquor 36 with a suitable copper solvent extractant. The copper is loaded onto the extractant which is subsequently washed 40 with fresh water and recirculated stripped electrolyte 44 from electrowinning 18. The copper on the washed organic is then contacted with an acidic solution, referred to as electrolyte 44, in the strip stage 42 whereby the copper is transferred from the organic into the electrolyte 44. The stripped organic is then recycled to the extraction stage 14. The electrolyte 44 from the strip stage 42 is subjected to electrowinning 18 to produce a copper cathode product 46.

Any suitable copper extractant which is capable of selectively removing copper from an acid solution also containing nickel/cobalt/zinc/iron/magnesium/manganese/cadmium may be used. An extractant which is found to be suitable is a hydroxy-oxime, such as LIX 84™ or LIX 860™ reagents from Cognis Corporation, or a combination of these reagents.

As stated above, the major portion of the raffinate 38 from the copper solvent extraction 14, is recycled to pressure oxidation 12 through the evaporator 16 which reduces the volume of water, thereby concentrating the sulphuric acid solution being recycled.

The other base metal or base metals which are present remain in solution after the copper solvent extraction 14, and are recirculated or recycled back in the raffinate 38 to the pressure oxidation 12. The concentration of these bas metals is allowed to build up to sufficient levels (e.g. equilibrium level) such that a minimal split stream can be taken off for base metal recovery, as will be described below. The volume of the split stream is optimized such that the most of the acid in the copper solvent extraction raffinate 38 can be recycled to pressure oxidation 12.

As stated above, the bleed stream from the raffinate 38 is further treated for the recovery of the base metals(s) present in the concentrate (e.g. Ni, Co or Zn). The bleed stream is subjected to purification (i.e. the removal of impurities, such as magnesium, manganese and cadmium, e.g. by precipitation) and then treated for the recovery of the base metal(s) by means of a suitable process, which may include neutralization, as indicated at 20, to produce base metal products 48. Gypsum byproducts 50 may also be produced as a result of this process.

Figure 2:
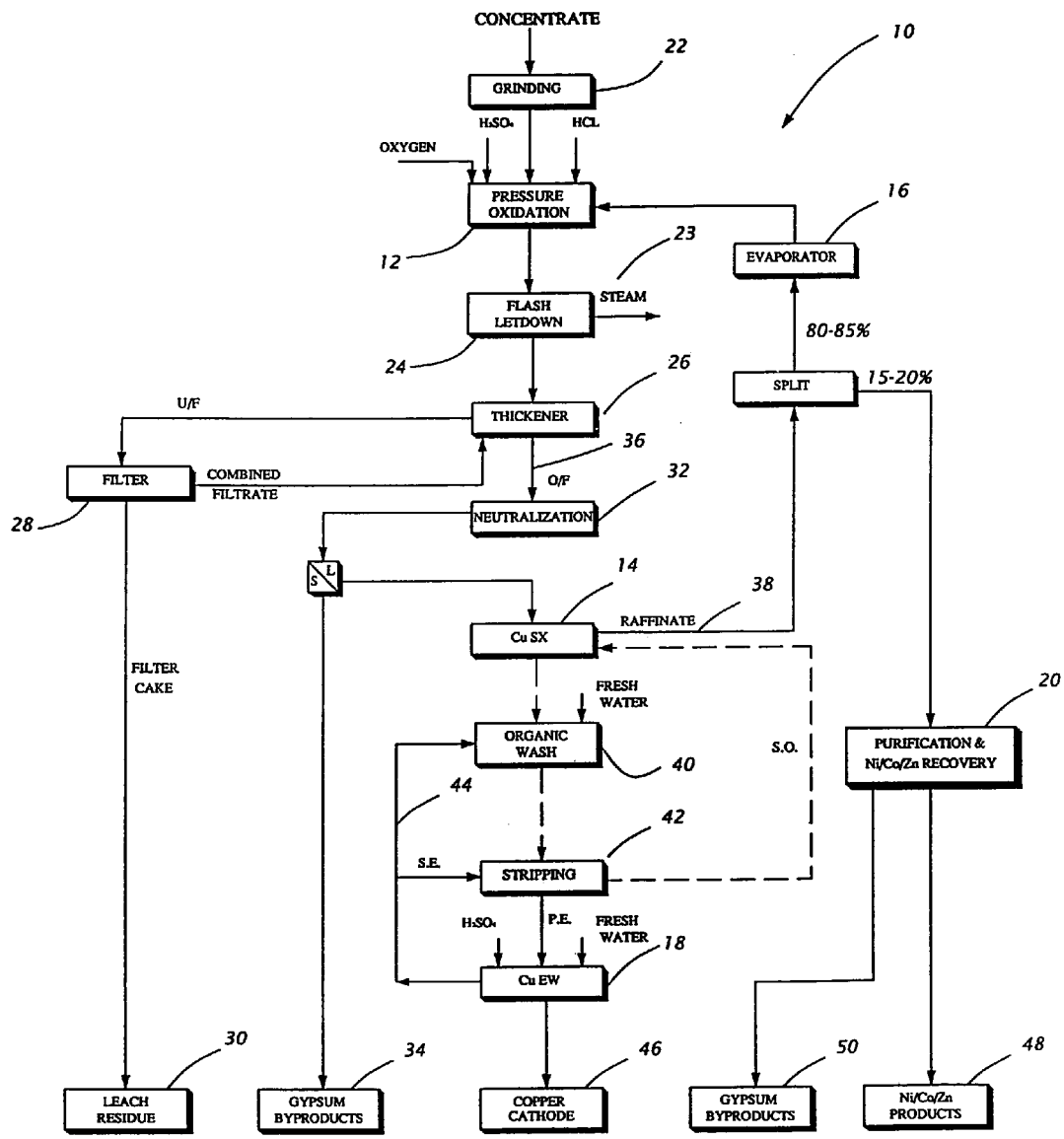
FIG. 2 is a flow diagram of another embodiment of the process of FIG. 1.

For some concentrates, notably those with high pyrite contents, the pressure oxidation 12 conditions may result in excessive sulphur oxidation. Under some circumstances, the autoclave leach liquor may contain >15 g/L free acid, which may need to be neutralized 32 prior to solvent extraction. This is shown in FIG. 2.

Figure 3:
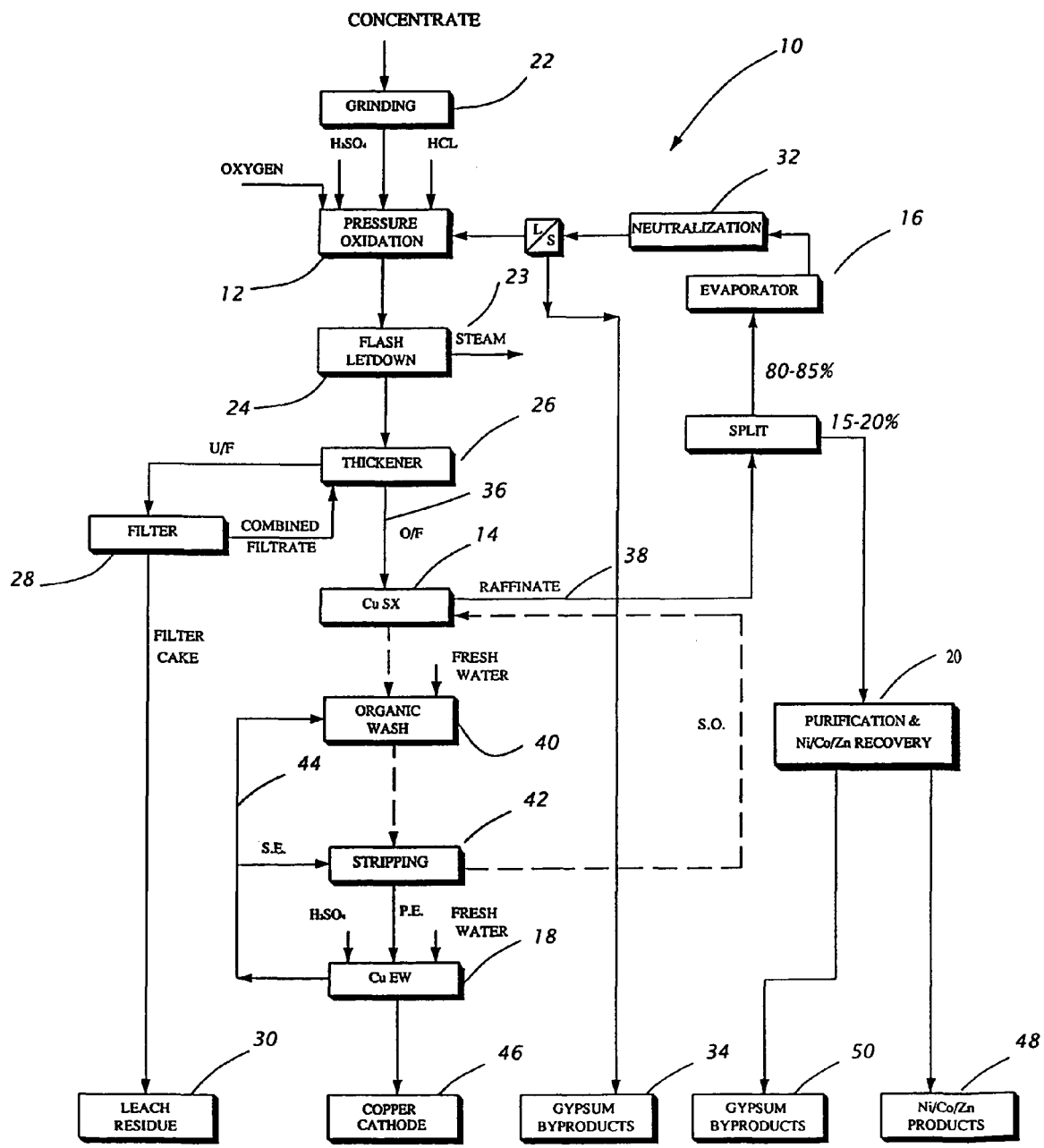
FIG. 3 is a flow diagram of yet another embodiment of the process of FIG. 1.

It may also be necessary to neutralize 32 a portion of the copper solvent extraction raffinate 38 after the evaporator 16 prior to recirculation to the pressure oxidation 12, to control the acid concentration in the autocalve. This is shown FIG. 3.

Neutralization 32 involves reacting the acidic stream (36, 38) with lime rock to raise the pH to about 2 to produce a neutral liquid and gypsum solid 34. Liquid solid separation is effected by thickening and/or filtration. The gypsum solid 34 is washed to recover entrained metal values, and can then be discarded.

Although certain preferred embodiments of the present invention have been shown and described in detail, it should be understood that various changes and modifications may be made therein without departing from the scope of the appended claims.

We claim:

1. A process for the extraction of a base metal value from an ore or concentrate containing copper and the base metal, comprising the steps of:

subjecting the ore or concentrate to pressure oxidation at 115° C. to 175° C. in the presence of oxygen and an acidic solution containing halide and sulphate ions to produce a product solution containing copper and the base metal;

subjecting the product solution to a copper extraction process for recovering copper from the solution;

recycling the product solution to the pressure oxidation without recovering the base metal therefrom to effect a build-up of the base metal in the product solution and, after building up the base metal in the product solution, splitting the product solution into a major portion and a minor portion after the copper extraction process, the major portion and the minor portion both containing the base metal;

recycling the major portion of the product solution to the pressure oxidation without recovering the base metal therefrom; and recovering the base metal from said minor portion; and wherein the base metal is selected from one or more of the group consisting of Ni and Co.

2. The process of claim 1, wherein the copper extraction process comprises subjecting the product solution to copper solvent extraction to produce a concentrated copper solution and a raffinate containing said base metal and wherein the product solution comprises said raffinate.

3. The process of claim 1, wherein the halide is chloride or bromide.

4. The process according to claim 1, wherein recovering the base metal from said minor portion comprises subjecting the minor portion to neutralization.

5. The process of claim 1, wherein said build-up of base metal in the product solution is effected until said base metal has reached an equilibrium concentration.

6. The process of claim 1 wherein the concentrate contains Cu and Ni in a ratio of about 20:1 to about 2:1.

7. The process of claim 1 wherein the concentrate contains Cu and Ni in a ratio of about 7:1 to about 5:1.

8. The process of claim 1, further comprising the step of causing the pH of the acidic solution to drop below a value of 2 during the pressure oxidation.

9. The process of claim 1, further comprising the step of causing the pH of the acidic solution to drop to a value of about 1 or below during the pressure oxidation.

10. The process of claim 1, wherein the major portion which is recycled to the pressure oxidation comprises about 80% to 85% by volume of the product solution.

* * * * *

UNITED STATES PATENT AND TRADEMARK OFFICE
CERTIFICATE OF CORRECTION

| | |
|---|---|
| PATENT NO. | : 7,438,874 B2 |
| APPLICATION NO. | : 10/443090 |
| DATED | : October 21, 2008 |
| INVENTOR(S) | : David L. Jones et al. |

Page 1 of 1

It is certified that error appears in the above-identified patent and that said Letters Patent is hereby corrected as shown below:

Abstract, line 2, delete "suiphide" and insert therefor --sulphide--;

Abstract, line 10, delete "for" and insert therefor --or--; and

Column 2, line 55, delete "discharg d" and insert therefor --discharged--.

Signed and Sealed this

Thirteenth Day of January, 2009

JON W. DUDAS
*Director of the United States Patent and Trademark Office*